US011514257B2

(12) United States Patent
Hartkorn et al.

(10) Patent No.: US 11,514,257 B2
(45) Date of Patent: Nov. 29, 2022

(54) METHOD OF MARKING A FIBER OPTIC CONNECTOR FOR LOW-LOSS OPTICAL CONNECTIONS

(71) Applicant: CORNING RESEARCH & DEVELOPMENT CORPORATION, Corning, NY (US)

(72) Inventors: Klaus Hartkorn, Painted Post, NY (US); Aislin Karina Sullivan, Mission, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/521,028

(22) Filed: Nov. 8, 2021

(65) Prior Publication Data
US 2022/0164558 A1   May 26, 2022

Related U.S. Application Data

(60) Provisional application No. 63/117,768, filed on Nov. 24, 2020.

(51) Int. Cl.
*G06K 7/14* (2006.01)
*G06K 7/10* (2006.01)
*G02B 6/44* (2006.01)

(52) U.S. Cl.
CPC ......... *G06K 7/1417* (2013.01); *G02B 6/447* (2013.01); *G06K 7/10722* (2013.01)

(58) Field of Classification Search
CPC ... G06K 7/1417; G06K 7/10722; G02B 6/447
See application file for complete search history.

(56) References Cited

U.S. PATENT DOCUMENTS 6,402,392 B1   6/2002   Yarita et al.
6,923,579 B2   8/2005   Fleenor et al.
9,016,953 B2   4/2015   Ott et al.

FOREIGN PATENT DOCUMENTS

JP        2005303809 A   *   10/2005

* cited by examiner

*Primary Examiner* — Laura A Gudorf
(74) *Attorney, Agent, or Firm* — Kapil U. Banakar

(57) ABSTRACT

A method and system for reading a marker embedded in a fiber optic connector, and a connector configured to be read by the method and system. The connector includes an outer assembly and a marker that is overlaid by the outer assembly. To read the marker, the connector is illuminated with an illuminating light in a first spectral band, and an image is formed using the light within the first spectral band that is reflected from the fiber optic connector. The reflected light includes at least a portion of the illuminating light which was transmitted through the outer assembly and reflected back toward a reader by the marker. Data contained in the marker is then extracted from the image.

20 Claims, 5 Drawing Sheets

METHOD OF MARKING A FIBER OPTIC CONNECTOR FOR LOW-LOSS OPTICAL CONNECTIONS

PRIORITY APPLICATION

This application claims the benefit of priority of U.S. Provisional Application No. 63/117,768, filed on Nov. 24, 2020, the content of which is relied upon and incorporated herein by reference in its entirety.

TECHNICAL FIELD

This disclosure relates generally to optical connectivity, and more particularly to a method for marking and reading a mark on a fiber optic connector.

BACKGROUND

Optical fibers are useful in a wide variety of applications, including the telecommunications industry for voice, video, and data transmissions. Benefits of optical fibers include wide bandwidth and low noise operation. In a telecommunications system that uses optical fibers, there are typically many locations where fiber optic cables containing the optical fibers connect to equipment or other fiber optic cables. To conveniently provide these connections, fiber optic connectors are often provided on the ends of fiber optic cables to non-permanently connect and disconnect optical elements in the fiber optic network.

The introduction of fiber optic connectors, however, may introduce insertion losses across the optical connection, e.g., at the junction between two or more optical fibers. One common optical connection in a network is one between two mated fiber optic connectors, such as within an adapter. It should be recognized, however, that the term "optical connection" may encompass other types of junctions between optical fibers. The insertion losses in coupling two optical fibers across an optical connection are generally a function of the alignment of the optical fiber ends, the width of the gap between the ends, and the optical surface condition at the ends. To minimize insertion losses, processes have been developed for reducing misalignments of the optical fibers across the optical connection.

FIGS. 1 and 2 illustrate an exemplary fiber optic connector 10 that may be found in fiber optic networks. Although the fiber optic connector 10 is shown in the form of a SC-type connector, the depicted features may be applicable to different connector designs. This includes ST, LC, and MU-type connectors, for example, and other single-fiber or multi-fiber connector designs. As shown in these figures, the connector 10 includes a ferrule 12 having a ferrule bore 14 ("micro-bore") configured to support an optical fiber 16, and a cylindrically shaped outer surface 17 that defines a longitudinal center axis of the ferrule 12. The connector 10 further includes a ferrule holder 18 from which the ferrule 12 extends, a housing 20 having a cavity 22 in which the ferrule 12 and ferrule holder 18 are received, and a connector body 24 configured to cooperate with the housing 20 to retain the ferrule 12 and ferrule holder 18 within the housing 20. More specifically, a back end of the ferrule 12 is received in a front portion of the ferrule holder 18 and is secured therein in a known manner (e.g., using a press-fit, adhesive, molding the ferrule holder 18 over the back end of the ferrule 12, etc.). The ferrule 12 and ferrule holder 18 may be a monolithic structure in some connectors.

The ferrule holder 18 may be biased to a forward position within the housing 20 by a spring 26 that extends over a rear portion of the ferrule holder 18. The rear portion of the ferrule holder 18 may have a reduced cross-sectional diameter or width as compared to the front portion. The spring 26 may also interact with the internal geometry of the connector body 24, which may be secured to the housing 20 using a snap-fit or the like. For example, FIGS. 1 and 2 illustrate a rear portion of the housing 20 having cut-outs or slots on opposite sides so as to define a split shroud. The connector body 24 may have tabs configured to be snapped into the slots and retained therein due to the geometries of the components.

When the connector 10 is assembled as shown in FIG. 1, a front end of the ferrule 12 projects beyond a front end of the housing 20. The ferrule end-face presents the optical fiber 16 for optical coupling with a mating component, e.g., another fiber optic connector (not shown). The ferrules 12 of two fiber optic connectors 10 may be coupled to each other using a mating sleeve or other adapter. Thus, when the fiber optic connector 10 is mated with the other component, the optical fiber(s) in the ferrule may be held in alignment with the optical fiber(s) of the mating ferrule to establish an optical connection.

At optical connections between fiber optic connectors, light exiting each optical fiber of one fiber optic connector (e.g., of one fiber optic cable) is introduced into a corresponding optical fiber within an adjacent fiber optic connector (e.g., of the other fiber optic cable). Bare optical fibers typically include an inner core through which the light travels, and an outer cladding configured to form a waveguide and minimize transmission losses through the optical fiber. If the optical fiber cores at an interconnection between optical fibers are misaligned, then transmission of an optical signal from one optical fiber to the other optical fiber may be inhibited, resulting in signal degradation at the interconnection. The cores must therefore be closely aligned to minimize transmission loss and optical return loss at optical connection points.

To facilitate accurate alignment between optical fiber cores, the connectors of the fiber optic cables may include one or more markers that provide information regarding one or more attributes of the connector. These attributes may include offsets between the micro-bore 14 and the center axis of the ferrule 12, e.g., the eccentricity and angle of the micro-bore 14 relative to the center axis. Ideally, each micro-bore 14 would be located such that the center of the micro-bore 14 coincides with the center axis of the ferrule 12. However, due to inherent tolerance variations in the materials and manufacturing processes, micro-bores 14 are typically offset from the ferrule center by some amount.

The optical fiber 16 is configured to be positioned in the micro-bore 14 and secured within the micro-bore 14 using a suitable adhesive or bonding agent. In current manufacturing methods, the micro-bore 14 is oversized relative to the optical fiber 16. This can result in the center of the optical fiber 16 being offset from the center of the micro-bore 14 by some amount. Moreover, due to inherent tolerance variations in the materials and processes used to manufacture the optical fiber 16, the inner core of optical fiber 16 is typically offset from the center of the outer cladding by some amount.

As described above, the position of the core of the optical fiber 16 relative to the mating location of the ferrule 12 may have a wide range of variance. That variation is influenced at least in part by: i) the position of the micro-bore 14 within the ferrule 12; ii) the position of the optical fiber 16 within the micro-bore 14; and iii) the position of the inner core within the optical fiber 16. One challenge for reducing insertion losses is to locate the center of the inner core of the optical fiber 16 as close as possible to the mating location on the ferrule given the variations present in current materials and manufacturing techniques. In many cases, the ferrule center operates as the mating location of the ferrule 12, and losses may be reduced by minimizing the offset between the center of the inner core of optical fiber 16 and the center axis of the ferrule 12. This offset is referred to as the core-to-ferrule offset, and indicates the deviation in the position of the inner core of optical fiber 16 from its optimal position (i.e., at the mating location).

During assembly and installation of a fiber optic cable, the attributes of the connector may be obtained from the marker, e.g., by scanning the marker with a marker reader. The installer may then use this information to minimize the core-to-ferrule offset, for example, by establishing an optimal fiber core placement within the ferrule 12 during the connector assembly process.

Ferrules 12 are typically marked using a laser or other printing method that either creates protrusions or voids. However, these protrusions or voids can create additional insertion losses by interfering with the alignment between the inner cores of optical fibers 16 being connected, such as when the connection involves two ferrules 12 being mated in a ceramic sleeve. Markers may also be misinterpreted by untrained installers, who may not know what the marker is, and think that the marker represents a defect in the connector or ferrule.

Thus, there is a need in the fiber optic industry for improved methods of marking fiber optic connectors to provide connector attributes to installers. More particularly, there is a need for a method of marking a ferrule that provides information related to the connector to trained installers, but that does not interfere with inner core alignment, and is not visually apparent to persons unaware of the presence of the marker.

SUMMARY

In an embodiment, an improved method of reading a marker on a fiber optic connector including an outer assembly is disclosed. The method includes illuminating the fiber optic connector with an illuminating light in a first spectral band, and receiving a reflected light from the fiber optic connector, the reflected light including at least a portion of the illuminating light which was transmitted through a portion of the outer assembly overlaying the marker. The method further includes capturing an image of the fiber optic connector from the reflected light in the first spectral band, and extracting data contained in the marker from the image.

In an aspect of the disclosed method, the first spectral band may be outside a visible range.

In another aspect of the disclosed method, the portion of the outer assembly overlaying the marker may be transparent in the first spectral band and opaque in a second spectral band that is within the visible range.

In another aspect of the disclosed method, the fiber optic connector may include a ferrule, and the marker may be located on the ferrule.

In another aspect of the disclosed method, the marker may be located on a back portion of the ferrule.

In another aspect of the disclosed method, illuminating the fiber optic connector with the illuminating light and capturing the image of the fiber optic connector may be synchronized in time.

In another aspect of the disclosed method, the reflected light may be received by a reader, and the fiber optic connector may be illuminated by emitting the illuminating light from the reader.

In another aspect of the disclosed method, capturing the image of the fiber optic connector in the first spectral band may include filtering the reflected light received from the fiber optic connector with a bandpass filter.

In another aspect of the disclosed method, the first spectral band may be within a spectral range of 700 to 2000 nm.

In another embodiment, an improved system for reading the marker on the fiber optic connector is disclosed. The system includes the fiber optic connector and a reader. The fiber optic connector includes the outer assembly having the portion that is transparent to the illuminating light in the first spectral band, the ferrule operatively coupled to the outer assembly, and the marker on the ferrule that defines one or more attributes of the fiber optic connector and that is located on the portion of the ferrule that is overlaid by the portion of the outer assembly which is transparent to the illuminating light. The reader includes a light source, an imaging device, and a computer. The light source is configured to emit the illuminating light. The imaging device is configured to receive the reflected light from the fiber optic connector, the reflected light including the portion of the illuminating light which was transmitted through the portion of the outer assembly that overlays the marker. The imaging device is further configured to capture the image of the fiber optic connector in the first spectral band from the reflected light. The computer is configured to extract data contained in the marker from the image.

In an aspect of the disclosed system, the first spectral band may be outside the visible range.

In another aspect of the disclosed system, the portion of the outer assembly that overlays the marker may be transparent in the first spectral band and opaque in the second spectral band that is within the visible range.

In another aspect of the disclosed system, the marker may be located on the back portion of the ferrule.

In another aspect of the disclosed system, the computer may be configured to synchronize the light source and the imaging device so that the illuminating light is emitted within a period of time during which the image of the fiber optic connector is captured.

In another aspect of the disclosed system, the imaging device may include the bandpass filter that filters the reflected light received from the fiber optic connector.

In another aspect of the disclosed system, the marker may include a pattern of light and dark areas that encode data defining the one or more attributes of the fiber optic connector.

In another aspect of the disclosed system, the outer assembly may include a ferrule holder and an inner housing, and the portion of the outer assembly that overlays the marker may include one or both of the ferrule holder and inner housing.

In another aspect of the disclosed system, the first spectral band may be within a spectral range of 700 to 2000 nm.

In another embodiment, a fiber optic connector is disclosed. The fiber optic connector includes the outer assembly having the portion that is transparent to the illuminating light in the first spectral band, the ferrule operatively coupled to the outer assembly, and the marker on the ferrule that defines the one or more attributes of the fiber optic connector, the marker being located on the portion of the ferrule that is overlaid by the portion of the outer assembly which is transparent to the illuminating light.

In an aspect of the disclosed fiber optic connector, the first spectral band may be outside the visible range, and the portion of the outer assembly that overlays the marker may be opaque in the second spectral band that is within the visible range.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a method of marking fiber optic connectors in a way that provides information to trained users who are aware of the marker, but that does not interfere with the alignment of coupled connectors, and is not readily apparent by looking at the connector.

To avoid affecting alignment, ferrules are marked in a location which does not interact with the adapters used to couple connectors. Such an area may be found on a portion of the outer surface of the ferrule farthest away from the end-face and the fiber entry lead-in area. These regions, such as near the outer diameter and the fiber entry lead-in area, are typically hidden by the connector hardware. The problem of connector hardware concealing the marker may be solved by reading the marker using light having a wavelength at which at the portions of the connector overlaying the marker are at least partially transparent. To this end, a reader for reading the marker may include an imaging device sensitive to that wavelength range. The reader may also include a light source emitting light within that wavelength range, a filter (e.g. interference filter) to reduce ambient stray light having wavelengths outside that wavelength range from reaching the imaging device, or both a light source that generates light and a filter that passes light in this wavelength range.

Figure 1:
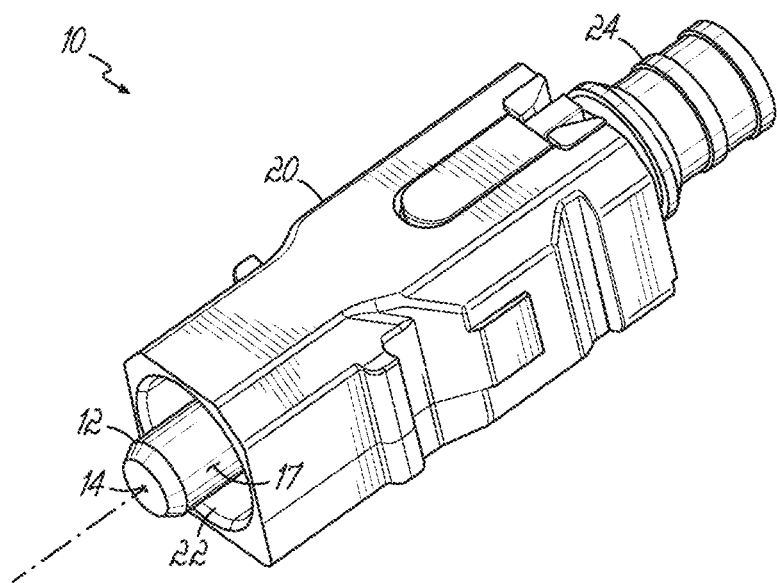
FIG. 1 is a perspective view of an exemplary fiber optic connector.
Figure 2:
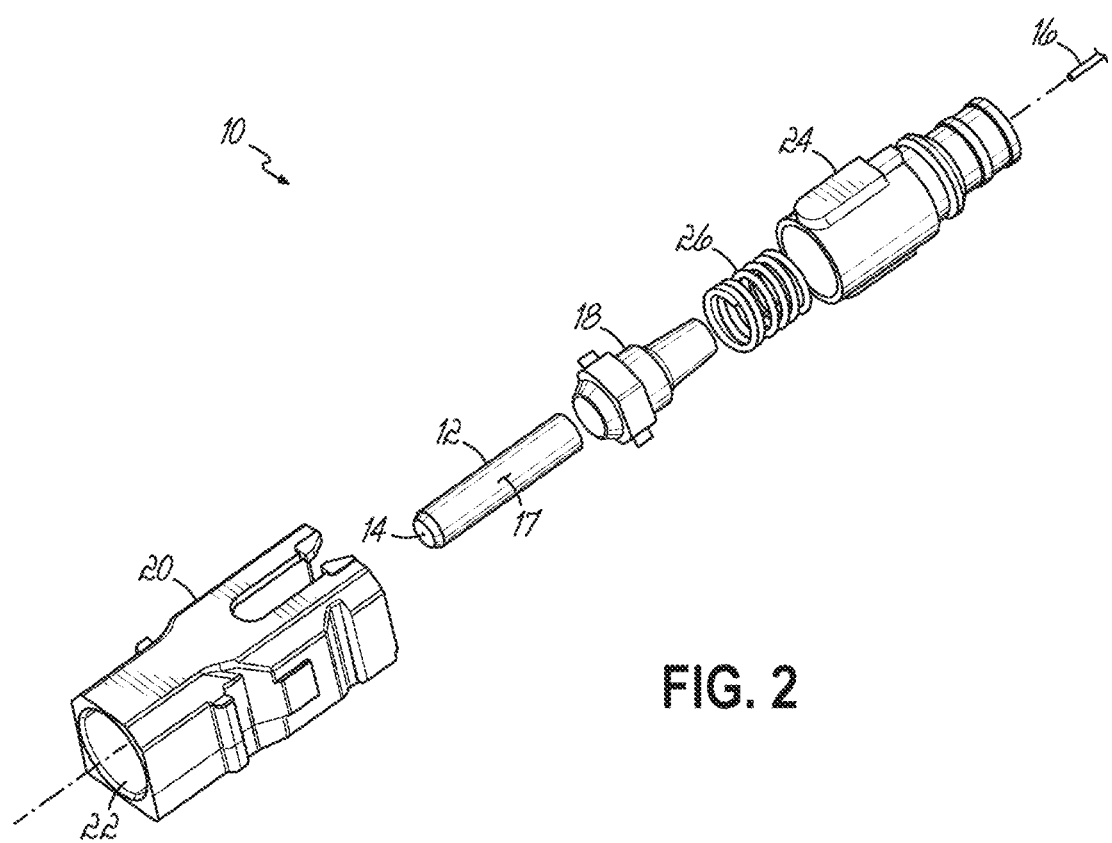
FIG. 2 is an exploded perspective view of the fiber optic connector shown in FIG. 1.
Figure 3:
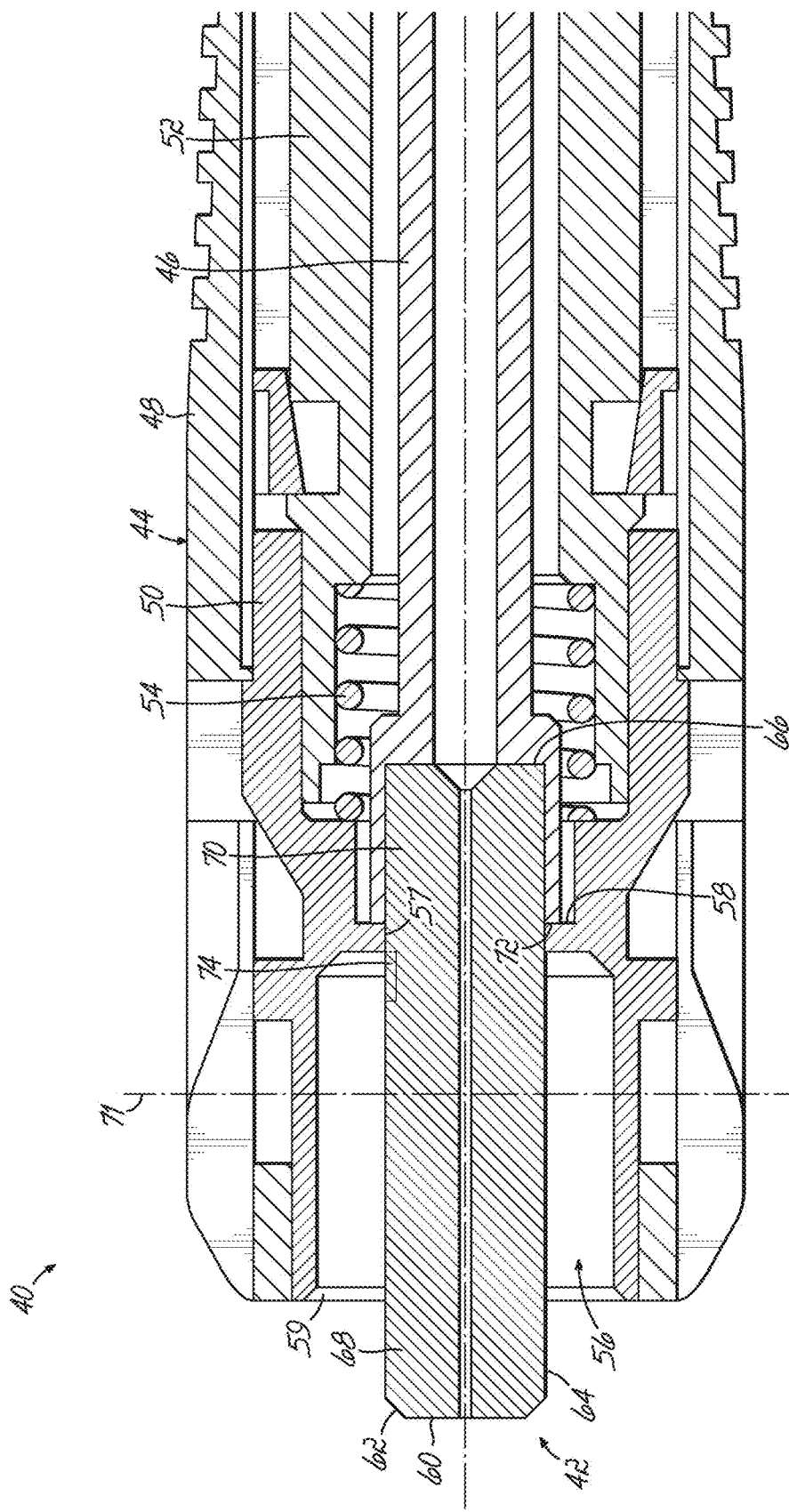
FIG. 3 is a cross-sectional view of a portion of an exemplary fiber optic connector including a ferrule having a marker which is overlaid by an outer assembly.

FIG. 3 depicts an end portion of an exemplary connector 40 including a ferrule 42 and an outer assembly 44. The outer assembly 44 may include a ferrule holder 46, an outer housing 48, an inner housing 50, a connector body 52, and an elastic member 54 (e.g., a spring). The inner housing 50 may include a cavity 56 having a back opening 57 into which the ferrule 42 is inserted, and a front opening 59 from which the ferrule 42 extends. The back opening 57 of cavity 56 may define a rim that provides a seat 58.

The ferrule 42 may include a front end-face 60, a front chamfer 62, a circumferential outer surface 64, and a back end-face 66. The outer surface 64 may be cylindrically shaped as shown, or may have another suitable cross-sectional shape, such as a polygon. A front portion 68 of ferrule 42 may extend through the back opening 57 and into the cavity 56. A back portion 70 of ferrule 42 may operatively couple the ferrule 42 to the ferrule holder 46. In an embodiment, the front portion 68 of ferrule 42 may be considered as including the front half of the ferrule 42 forward of a plane 71 bisecting the ferrule 42, and the back portion 70 of ferrule 42 may be considered as including the back half of the ferrule 42 rearward of the plane 71 bisecting the ferrule 42. In other embodiments, the plane 71 defining the front and back portions 68, 70 of ferrule 42 may be located somewhere other than at the midpoint between the front and rear end-faces 60, 66 of ferrule 42. For example, the plane 71 may be located at a point somewhere between 30% and 70% of the way from the front end-face 60 to the rear end-face 66 of ferrule 42.

A front end of the elastic member 54 may be operatively coupled to the ferrule holder 46, and a back end of the elastic member 54 may be operatively coupled to the connector body 52. The front and back ends of elastic member 54 may apply force in opposing directions against the ferrule holder 46 and connector body 52. Absent any opposing longitudinal force being applied to the ferrule 42, the force applied by the elastic member 54 may urge the ferrule holder 46 toward the inner housing 50 such that a front edge 72 of ferrule holder 46 abuts the seat 58 of inner housing 50. When sufficient longitudinal force is applied to the ferrule 42 to overcome the force provided by the elastic member 54 (such as when the connector 40 is connected to another optical element), the ferrule 42 may urge the ferrule holder 46 backward, further compressing the elastic member 54. The elastic member 54 may thereby maintain the front end-face 60 of ferrule 42 in close contact with the optical element to which the connector 40 is coupled.

The connector 40 may further include at least one marker 74 that is concealed by the outer assembly 44. The marker 74 may be located on the back portion 70 of ferrule 42, such as on a portion of the outer surface 64 corresponding to the back portion 70 of ferrule 42 (shown), the back end-face 66 of ferrule 42, or on a chamfer (not shown) connecting the outer surface 64 to the back end-face 66 of ferrule 42. The marker 74 may contain information encoded as a pattern on the surface of the ferrule 42, such as a one or two-dimensional barcode. The position of the marker 74 may also provide information, such as a direction of an offset between the inner core of optical fiber 16 and a center axis of the outer surface 64.

Figure 4:
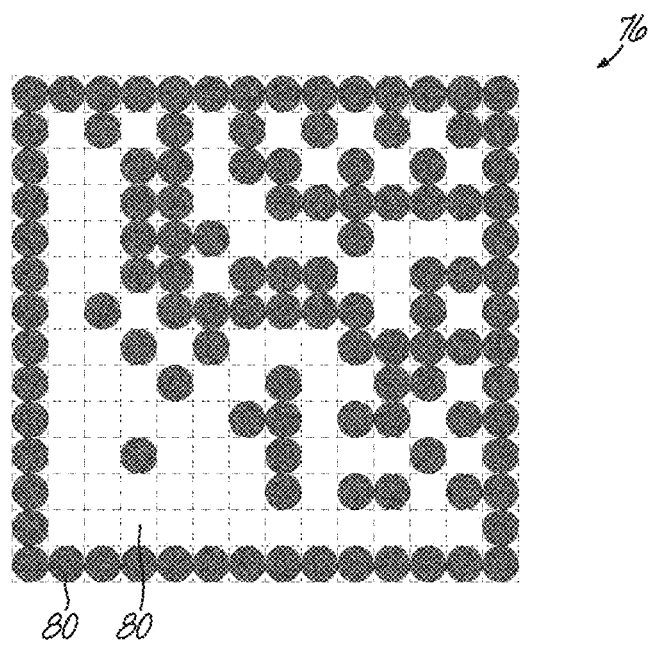
FIG. 4 is a schematic view of an exemplary marker of a type that may be used to mark the ferrule of FIG. 3.
Figure 5:
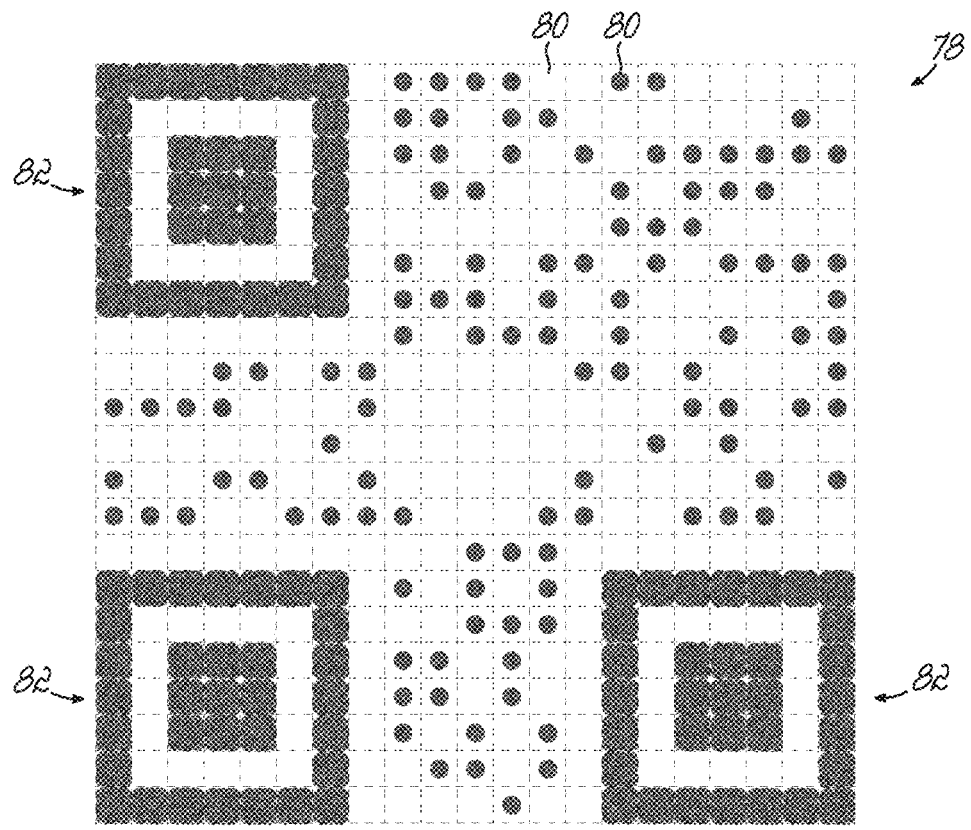
FIG. 5 is a schematic view of another exemplary marker of a type that may be used to mark the ferrule of FIG. 3.

FIGS. 4 and 5 depict exemplary two-dimensional barcodes 76, 78 each including a pattern of light and dark areas. A light area is an area that reflects a larger fraction of the light incident on the area than a dark area. Thus, the terms light and dark as used herein are relative to each other. The absolute amount of incident light reflected from each of the light and dark areas may vary over a range of 0% to 100% (e.g., 0-70% for dark areas, and 30-100% for light areas) so long as the light areas reflect more light than the dark areas.

The smallest element from which a barcode code is formed is commonly referred to as a module, and each barcode 76, 78 includes a plurality of modules 80. Barcodes may encode data using various arrangements of contrasting modules, with unique combinations of one or more modules forming symbols each representing one or more bits of data. For example, modules 80 having a relatively low reflectance (e.g., modules including a light-absorbing dot) may indicate one binary value, e.g., "1". In contrast, modules 80 with a relatively high reflectance (e.g., modules lacking a dot) may indicate another binary value, e.g., "0". Barcodes may also include one or more fiducial markers, such as the positioning symbols 82 located at three of the four corners of barcode 78. Fiducial markers may be used by devices reading the codes to determine the orientation and scale of the code.

The marker 74 may be located on the ferrule 42 so that the marker 74 is overlaid or otherwise covered by one or more of the ferrule holder 46, the inner housing 50, or any other component of the connector 40. Suitable locations on the ferrule 42 for the marker 74 may include any location where the marker 74 can be scanned, but is not visible when the ferrule 42 is installed in the outer assembly 44 of connector 40. The marker 74 may be read by illuminating the marker 74 with an illuminating light including wavelengths of light to which at least the portion of the outer assembly 44 overlaying the marker 74 is transparent, and employing an optical sensor sensitive in that wavelength range. Materials that may be suitable for portions of the outer assembly 44 covering the marker 74 are materials which are relatively opaque at wavelengths of light in the visible spectral band or "visible range" (e.g., 400-700 nm), and relatively transparent at one or more wavelengths outside the visible range (e.g., 700-2000 nm, also known as near-infrared). That is, a material which has a higher level of attenuation per unit thickness in the visual band than outside the visual band.

As used herein, opacity and transparency are also relative terms. The amount of light transmitted through the portion of the outer assembly 44 covering the marker 74 may vary over a range of 0% to 100% for each of the opaque and transparent spectral ranges (e.g., 0-60% for wavelengths of light for which the material is considered opaque, and 5-100% for wavelengths of light for which the material is considered transparent) so long as less light is transmitted through the material in the opaque spectral regions than in the transparent spectral regions.

Figure 6:
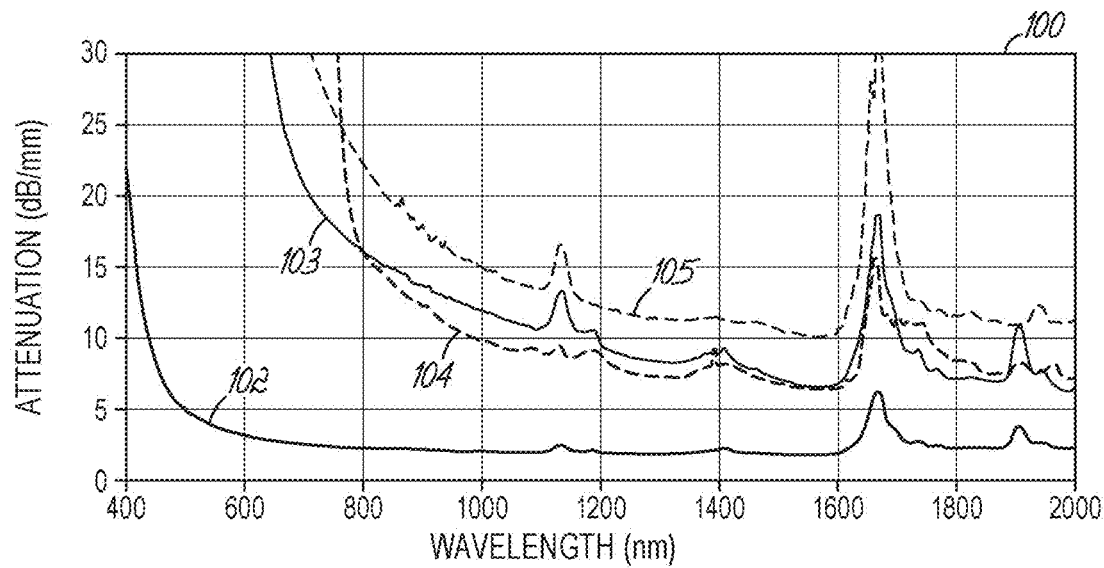
FIG. 6 is a graphical view of attenuation verses wavelength for some exemplary materials which may be used to form all or a portion of the outer assembly of FIG. 3.
Figure 7:
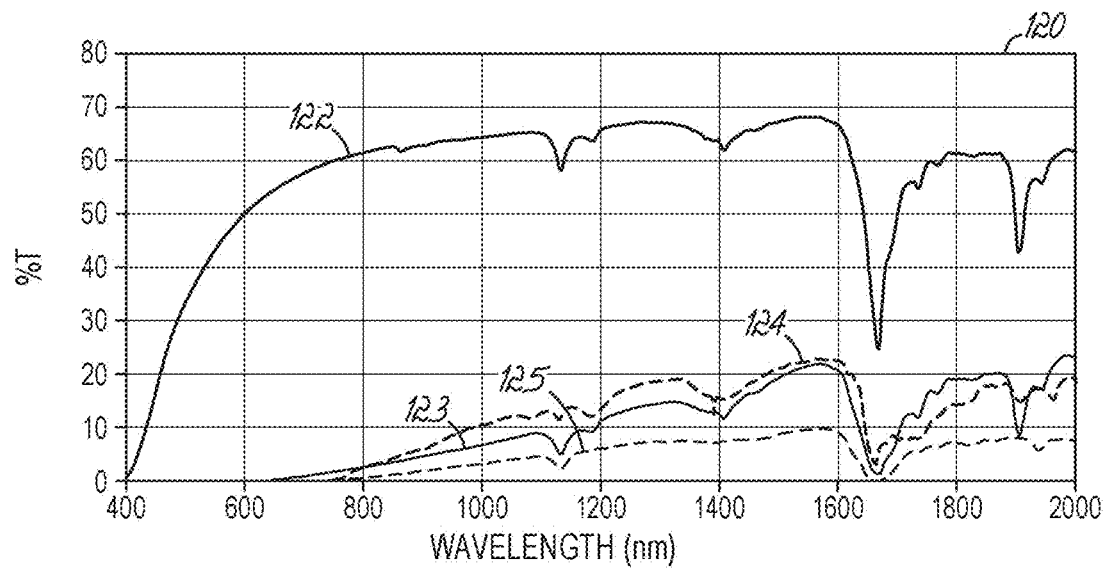
FIG. 7 is a graphical view of transmission percentage verses wavelength for the materials characterized by the graph of FIG. 6.

FIG. 6 depicts a graph 100 including plots 102-105 of attenuation per millimeter of thickness verses wavelength for a plurality of exemplary materials which may have suitable optical properties for portions of the outer assembly 44 overlaying the marker 74. FIG. 7 depicts a graph 120 including plots 122-125 of percentage of light transmitted vs wavelength for a one millimeter thickness of the same materials. Plots 102 and 122 represent the attenuation and transmission characteristics, respectively, measured for a 20% glass fiber filled polyetherimide thermoplastic sold under the name Ultem® by Saudi Basic Industries Corporation (SBIC) of Riyadh, Saudi Arabia. Plots 103 and 123 represent the attenuation and transmission characteristics, respectively, measured for an amorphous, transparent polyetherimide plastic including a white colorant and also sold under the name Ultem® by SBIC. Plots 104 and 124 represent the attenuation and transmission characteristics, respectively, measured for a liquid crystal polymer including a beige colorant and sold under the name Vectra® by Ticona Polymers, Inc. of Florence, Ky., United States. Plots 105 and 125 represent the attenuation and transmission characteristics, respectively, measured for a polybutylene terephthalate material including a blue colorant and sold under the name Valox® by SBIC. As can be seen from the plots, the relative transparency of each of the materials is significantly higher for light having wavelengths above 700 nm than for light having wavelengths below 700 nm. As can be seen from the plots, each of these materials is, generally speaking, relatively opaque to light in the spectral region between 400 and 700 nm, and relatively transparent to light in the spectral region between 700 and 2000 nm.

The exemplary materials described above are only a sample of the available materials that may have suitable optical properties for use in the optical connectors described herein. Thus, it should be understood that other materials having suitable optical properties could also be used, and embodiments are thus not limited to any of the specific materials described above. For example, any engineering grade thermoplastic having suitable optical properties could potentially be used for fabricating the outer assembly 44 overlaying the marker 74.

Figure 8:
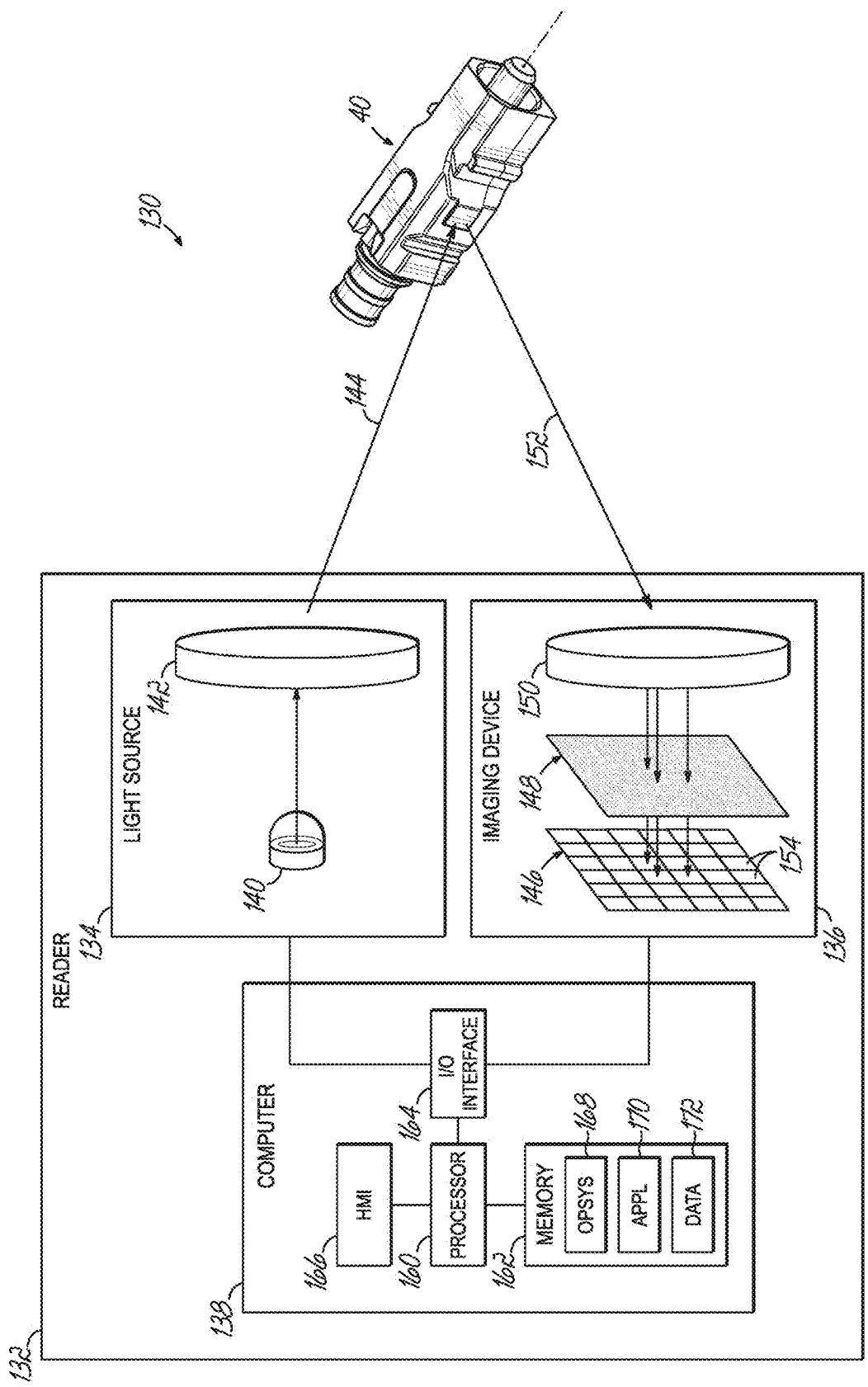
FIG. 8 is a schematic view of an exemplary reader that may be used to read the marker of the connector in FIG. 3.

FIG. 8 depicts an exemplary operating environment 130 including the connector 40 and a reader 132. The reader 132 may include a light source 134 and an imaging device 136 each operatively coupled to a computer 138. The computer 138 may be configured to control the light source 134 and imaging device 136, and to decode images of markers 74 captured by the imaging device 136. In an alternative embodiment, the reader 132 may rely on ambient light to read the marker 74 of connector 40, in which case the light source 134 may be omitted.

The light source 134 may include an emitter 140, such as a light emitting diode (LED), and a lens 142 or other optical device that directs light 144 emitted by the emitter 140 in a direction the reader 132 is pointed, e.g., toward the connector 40. The emitter 140 may emit light having a narrow emission band, such as may be emitted by a near-infrared light emitting diode, single-mode infrared laser diode, or other suitable light emitter. In an alternative embodiment, the emitter 140 may emit light having a relatively broad spectral band, and the light source 134 may include a bandpass filter (not shown) that filters the light 144 before the light exits the reader 132. In either case, the light 144 directed toward the connector 40 may have an emission spectrum that is outside the spectral range of visible light, but within a spectral range where the material used to form one or more components of the connector 40 is relatively transparent, e.g., 700 nm to 2000 nm.

The emitter 140 may be controlled by the computer 138 to emit light for a period of time during which one or more images of the connector 40 are captured by the imaging device 136. The computer 138 may also synchronize activation of the light source 134 and the imaging device 136. Synchronization of the light source 134 and image capture may allow the emitter 140 to emit a more intense luminous flux than if the light source 134 is operated for in a non-burst or continuous mode. This increased intensity of the light 144 illuminating the connector 40 may produce a corresponding increase in the contrast between light and dark regions of the marker 74 in the captured image.

The imaging device 136 may include a light sensor 146, a filter 148, and a lens 150 or other optical element (e.g., a mirror) that focuses received light 152 to form an image on the light sensor 146. The light sensor 146 may be an imaging sensor, such as a charge-coupled device (CCD) or active-pixel sensor (CMOS sensor), that includes a plurality of sensor elements or "pixels" 154 arranged in a two-dimensional array. Each pixel 154 may be configured to convert light 152 incident on the pixel 154 into an electrical signal indicative of an intensity of the light received by that pixel 154. The filter 148 may be configured so that the light 152 received by each pixel 154 first passes through the filter 148.

The filter 148 may be a bandpass filter configured to selectively transmit light in a pre-defined spectral range, or passband, that includes the light emitted by the light source 134, and absorb, reflect, or otherwise attenuate light outside those spectral ranges. The filter 148 may be a narrow-band bandpass filter, such as a bandpass filter having a full-width at half maximum (FWHM) of less than 20 nm, e.g., 10 nm. Each pixel 154 may provide a signal indicative of the amount of light 152 received in the passband of the filter 148. The light sensor 146 may thereby provide in image of the connector 40 viewed in the narrow-band light emitted by the light source 134, the narrow-band light transmitted by the filter 148, or a combination of the narrow-band light emitted by the light source 134 and transmitted by the filter 148. This narrow-band image may show the marker 74 in sufficient detail so as to allow the marker 74 of connector 40 to be decoded by the reader 132.

The computer 138 of reader 132 may include a processor 160, a memory 162, an input/output (I/O) interface 164, and a Human Machine Interface (HMI) 166. The processor 160 may include one or more devices selected from micropro-cessors, micro-controllers, digital signal processors, micro-computers, central processing units, field programmable gate arrays, programmable logic devices, state machines, logic circuits, analog circuits, digital circuits, or any other devices that manipulate signals (analog or digital) based on operational instructions stored in memory 162. Memory 162 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 160 may operate under the control of an operating system 168 that resides in memory 162. The operating system 168 may manage computer resources so that computer program code embodied as one or more computer software applications 170 residing in memory 162 can have instructions executed by the processor 160. One or more data structures 172 may also reside in memory 162, and may be used by the processor 160, operating system 168, or application 170 to store or manipulate data.

The I/O interface 164 may provide a machine interface that operatively couples the processor 160 to other devices and systems, such as the light source 134 and imaging device 136. The application 170 may thereby work coop-eratively with the other devices and systems by communi-cating via the I/O interface 164 to provide the various features, functions, applications, processes, or modules comprising embodiments of the reader 132. The application 170 may also have program code that is executed by one or more external resources, or otherwise rely on functions or signals provided by other system or network components external to the computer 138. Indeed, given the nearly endless hardware and software configurations possible, per-sons having ordinary skill in the art will understand that embodiments may include applications that are located externally to the computer 138, distributed among multiple computers or other external resources, or provided by com-puting resources (hardware and software) that are provided as a service over a network, such as a cloud computing service.

The HMI 166 may be operatively coupled to the processor 160 of computer 138 to allow a user to interact directly with the reader 132. The HMI 166 may include video or alpha-numeric displays, a touch screen, a speaker, and any other suitable audio and visual indicators capable of providing data to the user. The HMI 166 may also include input devices and controls such as an alphanumeric keyboard, a pointing device, keypads, pushbuttons, control knobs, microphones, etc., capable of accepting commands or input from the user and transmitting the entered input to the processor 160.

The computer 138 may also be operatively coupled to one or more external resources, e.g., via a communication net-work. External resources may include, but are not limited to, servers, databases, mass storage devices, peripheral devices, cloud-based network services, or any other resource that may be used by the computer 138 to implement features of the reader 132. This may include transmitting data decoded from the connector 40 to an external resource, and receiving data from the external resource in response to the transmis-sion.

In operation, the reader 132 may read the connector 40 using one or more of a plurality of different processes depending on how the reader 132 and connector 40 are configured. The process used to read the connector 40 may also depend on the ambient conditions under which the connector 40 is being read. For example, the reader 132 may activate the light source 134 to illuminate the connector 40 with light having a spectral content configured to pass through all or part of the outer assembly 44 of connector 40. That is, the light source 134 may be activated to emit narrow-band light that penetrates the outer assembly 44 of connector 40. If a sufficiently intense narrow-band light is used, the reader 132 may be able to decode the marker 74 without the need for narrow-band filtering the light 152 reflected by the connector 40. For example, the connector 40 may be illuminated by a bright flash of narrowband light synchronized with the capture of an image of the connector 40 by the imaging device 136. In this embodiment, the filter 148 could be omitted, or have a relatively wide passband such as a long-pass infrared filter, e.g., having passband of 700-1600 nm. In some embodiments, the light sensor 146 may use a material which is more sensitive to light at wavelengths outside the visual range, e.g., Indium-Gallium-Arsenide (InGaAs). Thus, the light sensor 146 may be configured to be selectively sensitive to light at wavelengths used to read the marker 74 by selection of the materials used for the sensor, filtering of the light 152 by the filter 148, or both material selection and filtering.

The reader 132 may read the connector 40 by relying on the wavelength-selective sensitivity of the imaging device to the reflected light 152 received from the connector 40. To this end, the pixels 154 of light sensor 146 may be config-ured, by one or more of material selection or filtering of the light 152, to only be sensitive to light within a spectral band where the outer assembly 44 of connector 40 is relatively transparent, e.g., 800-1600 nm. In this case, the reader 132 may rely, at least in part, on ambient light reflected from the connector 40 to read the marker 74. Thus, under conditions in which the ambient light contains a sufficient amount of energy in the passband of the filter 148, or to which the light sensor 146 is selectively sensitive, the reader 132 may be configured to read the connector 40 without the need for additional illumination from the light source 134. Thus, it should be understood that any combination of narrowband illumination, wavelength selective sensitivity, or narrowband illumination and wavelength selective sensitivity may be used to read the marker 74 through the outer assembly 44 of connector.

In an exemplary embodiment, the ferrule 42 may be marked with a barcode or other marker that contains data indicative of raw ferrule attributes using a laser, or some other suitable method of marking the ferrule 42. Other suitable methods of marking the ferrule 42 may include, but are not limited to, selective deposition of a marking material, e.g., printing using ink, or application of a label, for example. The ferrule 42 may then be incorporated into the connector 40, e.g., by over-molding the ferrule holder 46 and installing the remaining components of the connector 40.

When the ferrule attribute information is needed (e.g., during installation of the connector 40 onto an optical fiber 16 or the connection of the connector 40 to another optical device), the information may be retrieved using the reader 132. The marker 74 may be read immediately before the connector 40 is assembled in order to associate the ferrule attribute information with a serial number of the connector. The marker 74 may also be read prior to assembling the optical fiber 16 into the connector 40 so that the ferrule attribute information can be used to orient the optical fiber 16 to achieve optimal fiber core placement within the micro-bore 14. In any case, this information may be stored by the reader 132 in local memory 162, transmitted by the reader 132 to a remote database (not shown), or both stored locally and transmitted to the remote database.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A method of reading a marker on a fiber optic connector including an outer assembly that overlays the marker, comprising:
    illuminating the fiber optic connector with an illuminating light in a first spectral band;
    receiving a reflected light from the fiber optic connector, the reflected light including at least a portion of the illuminating light which was transmitted through a portion of the outer assembly overlaying the marker;
    capturing an image of the fiber optic connector from the reflected light in the first spectral band; and
    extracting data contained in the marker from the image.

2. The method of claim 1, wherein the first spectral band is outside a visible range.

3. The method of claim 2, wherein the portion of the outer assembly overlaying the marker is transparent in the first spectral band and opaque in a second spectral band that is within the visible range.

4. The method of claim 1, wherein the fiber optic connector further includes a ferrule, and the marker is located on the ferrule.

5. The method of claim 4, wherein the marker is located on a back portion of the ferrule.

6. The method of claim 1, wherein illuminating the fiber optic connector with the illuminating light and capturing the image of the fiber optic connector are synchronized in time.

7. The method of claim 1, wherein the reflected light is received by a reader, and the fiber optic connector is illuminated by emitting the illuminating light from the reader.

8. The method of claim 1, wherein capturing the image of the fiber optic connector in the first spectral band includes filtering the reflected light received from the fiber optic connector with a bandpass filter.

9. The method of claim 1, wherein the first spectral band is within a spectral range of 700 to 2000 nm.

10. A system comprising:
    a fiber optic connector including:
        an outer assembly having a portion that is transparent to an illuminating light in a first spectral band;
        a ferrule operatively coupled to the outer assembly; and
        a marker on the ferrule that defines one or more attributes of the fiber optic connector, the marker being located on a portion of the ferrule that is overlaid by the portion of the outer assembly which is transparent to the illuminating light; and
    a reader including:
        a light source configured to emit the illuminating light;
        an imaging device configured to receive a reflected light from the fiber optic connector, the reflected light including the portion of the illuminating light which was transmitted through the portion of the outer assembly that overlays the marker, and capture an image of the fiber optic connector in the first spectral band from the reflected light, and
        a computer configured to extract data contained in the marker from the image.

11. The system of claim 10, wherein the first spectral band is outside a visible range.

12. The system of claim 11, wherein the portion of the outer assembly that overlays the marker is transparent in the first spectral band and opaque in a second spectral band that is within the visible range.

13. The system of claim 10, wherein the marker is located on a back portion of the ferrule.

14. The system of claim 10, wherein the computer is configured to synchronize the light source and the imaging device so that the illuminating light is emitted within a period of time during which the image of the fiber optic connector is captured.

15. The system of claim 10, wherein the imaging device includes a bandpass filter that filters the reflected light received from the fiber optic connector.

16. The system of claim 10, wherein the marker includes a pattern of light and dark areas that encode data defining the one or more attributes of the fiber optic connector.

17. The system of claim 10, wherein:
    the outer assembly includes a ferrule holder and an inner housing, and
    the portion of the outer assembly that overlays the marker includes one or more of the ferrule holder and inner housing.

18. The system of claim 10, wherein the first spectral band is within a spectral range of 700 to 2000 nm.

19. A fiber optic connector, comprising:
    an outer assembly including a portion that is transparent to an illuminating light in a first spectral band;
    a ferrule operatively coupled to the outer assembly; and a marker on the ferrule that defines one or more attributes of the fiber optic connector, the marker being located on a portion of the ferrule that is overlaid by the portion of the outer assembly which is transparent to the illuminating light.

20. The fiber optic connector of claim 19, wherein the first spectral band is outside a visible range, and the portion of the outer assembly that overlays the marker is opaque in a second spectral band that is within the visible range.

\* \* \* \* \*